United States Patent Office 3,470,111
Patented Sept. 30, 1969

3,470,111

1-ARYLBICYCLO[1.1.0]BUTANES, INTERMEDIATES THERETO AND HOMOPOLYMERS THEREOF

Elwood P. Blanchard, Jr., Williamsville, N.Y., assignor to E. I. du Pont de Nemours and Company, Wilmington, Del., a corporation of Delaware No Drawing. Continuation-in-part of application Ser. No. 601,325, Dec. 13, 1966. This application Jan. 25, 1968, Ser. No. 700,364
Int. Cl. C08f *13/00;* C07c *13/34*
U.S. Cl. 260—2 4 Claims

ABSTRACT OF THE DISCLOSURE

A process for preparing 1-arylbicyclo[1.1.0]butanes which involves contacting a 1-aryl-1,3-dihalocyclo-butane with a metal. The bicyclobutanes can be homopolymerized into homopolymers useful as shaped objects and in the form of self-supporting films.

CROSS-REFERENCE TO RELATED APPLICATIONS

This application is a continuation-in-part of my copending applications Ser. No. 601,325, filed Dec. 13, 1966, and now abandoned, and Ser. No. 560,123, filed June 24, 1966.

FIELD OF THE INVENTION

This invention relates to bicyclobutanes, for the process for preparing the bicyclobutanes, the homopolymers thereof and to the cyclobutane precursors of the bicyclobutanes.

SUMMARY OF THE INVENTION

This invention is directed to 1-arylbicyclo[1.0]butanes, the homopolymers thereof and to a process for preparing said 1-arylbicyclo[1.1.0]butanes having the formula

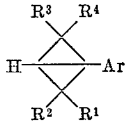

I wherein Ar is aryl or alkaryl hydrocarbon radical of 6–18 carbon atoms and $R^1$, $R^2$, $R^3$ and $R^4$ are the same or different and are hydrogen or a hydrocarbyl radical which are free of aliphatic carbon-carbon unsaturation and of 1–18 carbon atoms. The process of this invention comprises dehalogenating a dihalogen compound, of the formula

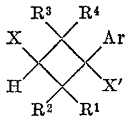

II wherein X is halogen and X′ is halogen or hydroxy and Ar, $R^1$, $R^2$, $R^3$, and $R^4$ are as defined above, by contacting and heating said compound with at least a stoichiometric amount of a metal of atomic numbers 3, 4, 11–13, 19–32, 37–51, 55–84 and 87–103, inclusive. The compounds of Formula II and the process for their preparation are embodiments of this invention. The bicyclobutanes of Formula I are useful for the preparation of homo- and copolymers useful for producing polymers which can be fabricated into self-supporting films and as shaped objects. The compounds of Formula II are useful as intermediates for preparing these arylbicyclobutanes.

DESCRIPTION OF THE PREFERRED EMBODIMENTS

Term "hydrocarbyl free of ethylenic or acetylenic carbon-to-carbon unsaturation" used above means that the hydrocarbyl group is either saturated or contains only aromatic unsaturation. Thus, this term includes, e.g., alkyl, cycloalkyl, aryl, alkaryl, and aralkyl. Preferred herein are hydrocarbon groups containing 1–12 carbon atoms and particularly those containing 1–6 carbon atoms.

Illustrative hydrocarbyl groups as defined above include alkyl groups such as methyl, ethyl, tertiary butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5 - dicyclohexylcyclohexyl, cyclooctadecyl, and the like; aryl groups such as phenyl, naphthyl, anthryl, p-phenylphenyl, p-biphenylphenyl, naphthacenyl, benzanthryl, chrysenyl, and the like; alkaryl groups such as p-tolyl, p-cumenyl, 2,4,6-tributylphenyl, 9,10-diethyl-1-anthryl, 6-methyl-2 - naphthyl, and the like; aralkyl groups such as benzyl, phenylethyl, diphenylmethyl, α-naphthylethyl, 2 - (2 - anthryl) ethyl, 4-(2-anthryl)butyl, and the like.

The aryl and alkaryl groups just named also illustrate the above definition of Ar.

Halogen in the definitions of X and X′ is preferably of atomic number 19–50, inclusive, i.e., chlorine, bromine, or iodine. Metals operable in the dehalogenation of compounds of Formula III in which X′ is halogen include all the free metals, i.e., elements of atomic numbers 3, 4, 11–13, 19–32, 37–51, 55–84, and 87–103, inclusive. Preferred metals are those most reactive with halogen, such as zinc, alkali metals, particularly lithium, sodium, potassium, and rubidium, and alkaline earth metals, particularly magnesium, calcium, and strontium.

In the process of dehalogenating a compound of Formula II in which X′ is halogen by the action of a metal, it suffices to bring the metal and the dihalide into intimate contact. No additives are required. It is convenient, though not essential, to provide for dissipation of the heat of reaction by carrying out the reaction in the presence of an organic liquid which is inert to the reactants and products. Suitable media include hydrocarbons, such as pentane, hexane, octane, benzene, toluene, the xylenes and the like, and ethers, such as dimethyl ether, diethyl ether, dibutyl ether, tetrahydrofuran, dioxolane, dioxane, and the like.

The dehalogenation reaction may be carried out at temperatures in the range from −40° C. to 200° C., depending on the activity of the metal employed. Preferred temperatures for this reaction are in the range from −10° C. to 100° C. Pressure is not a critical factor in this reaction and pressures both above and below atmospheric may be employed. Atmospheric pressure is preferred for convenience.

Compounds of Formula I are prepared from the corresponding 3-ketocyclobutanecarboxylic acids by the following series of reactions:

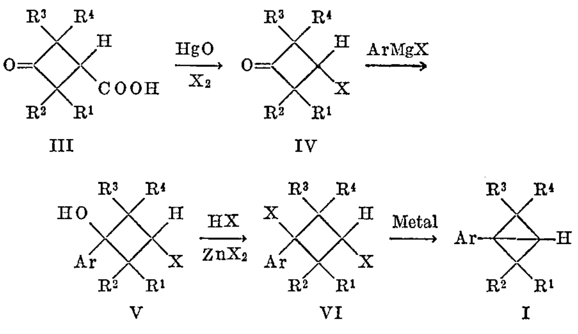

in which Ar, X, and the R's are defined as above. This procedure is illustrated in Example 1 below. An alternative procedure for preparing compounds of Formula VI from compounds of Formula III is illustrated in Example 2.

The 3-ketocyclobutane carboxylic acids (III) can be produced by the $OsO_4$ oxidation of the corresponding 3-methylenecyclobutanecarboxylic acid. For example, when 15 g. of 3-methylenecyclobutanecarboxylic acid dispersed in 300 cc. of ether is heated with 0.14 g. $OsO_4$ and 60.5 g. of powdered $NaIO_4$ is added in small portions during 0.5 hour followed by stirring 5 hours at room temperature and then overnight, 10.7 g. of 3-ketocyclobutanecarboxylic acid can be recovered from the reaction mixture. F. F. Caserio and J. D. Roberts, J. Am. Chem. Soc., 80, 5837 (1958).

The 3-methylenecyclobutanecarboxylic acids can be produced by the reaction of allene and substituted allenes with acrylonitriles at 200° C. and autogenous pressure followed by hydrolysis of the 3-methylenecyclobutanecarbonitrile with strong alkali and subsequent acidification and recovery. F. F. Caserio, S. H. Parker, R. Piccolini and J. D. Roberts, ibid., 80, 5507 (1958).

By this procedure the following starting reactants can be produced 2,2,4,4-tetramethyl-3-ketocyclobutanecarboxylic acid, 2,4-diphenyl-3-ketocyclobutanecarboxylic acid, 2-dodecyl-3-ketocyclobutanecarboxylic acid, 2-hexadecyl-3-ketocyclobutanecarboxylic acid, 2,2,4,4-tetrabutyl-3-ketocyclobutanecarboxylic acid, 2,4-dinaphthyl-3-ketocyclobutanecarboxylic acid and the like.

The homopolymers of the compounds of Formula I are prepared by reacting a 1-arylbicyclo[1.1.0]butane monomer of Formula I in bulk, dispersion, emulsion, or in solution in an inert organic solvent at a temperature of —100° C. to 160° C. in the presence of an initiator selected from a free-radical generating initiator, an anionic initiator, a cationic initiator, or a coordination-type initiator.

The free-radical-generating initiators may be selected from a wide variety of compounds representative of this type of initiator. Included are the azo initiators, for example, $\alpha,\alpha'$-azodiisobutyronitrile, 1,1'-azodicyclohexanecarbonitrile, dimethyl $\alpha,\alpha'$-azodiisobutyrate and $\alpha,\alpha'$-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the monomer being polymerized. Other sources of free radicals for initiating polymerization may also be used such as electron bombardment, ultraviolet light in the presence of a sensitizer, and the like. Free-radical-generating initiators are preferred.

Suitable solvents and/or dispersion media for the free-radical polymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide and the like. As indicated above, it is not essential that a solvent or dispersion medium be used, and bulk polymerizations can be carried out.

A wide variety of anionic initiators are operable herein for the polymerization of 1-arylbicyclo[1.1.0]butanes. Representative anionic initiators that can be used include the alkali metal alkyls, for example, n-butyllithium and methyllithium; the alkali metal alkoxides, for example, potassium t-butoxide and sodium methoxide; and the alkali metal aryls, for example, sodium naphthalene. The concentration of anionic initiator employed can range from 0.01 to 10 weight percent of the monomer being polymerized. The order of addition of the monomer and the initiator is not critical.

Suitable reaction media for the anionic polymerization include ethers, for example, diethyl ether, tetrahydrofuran, and the dimethyl ether of ethylene glycol; hydrocarbons, for example, benzene and hexane; chlorinated hydrocarbons, for example, chlorobenzene; and amides, for example, dimethylformamide. The ethers are preferred.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride and the like. The concentration of initiator may be from 0.01 to 10 weight percent of the monomer being polymerized.

Coordination-type initiators usually involve a combination of a lower valent transition metal chloride with an organometallic compound. Specific combinations which are useful include diisobutylaluminum chloride with vanadium tris(acetylacetonate), diisobutylaluminum chloride with vanadium oxychloride, triisobutylaluminum with titanium tetrachloride, methylmagnesium bromide with titanium tetrachloride, lithium aluminumtetradecyl with titanium tetrachloride and the like. The concentration of initiator may be from 0.01 to 10 weight percent of the monomer being polymerized.

Preferred reaction media for carrying out polymerizations initiated by coordination-type catalysts are the hydrocarbons, particularly aliphatic hydrocarbons such as hexane and cyclohexane and the halogenated hydrocarbons such as tetrachloroethylene.

The reaction media for carrying out cationic-initiated polymerizations are the same as those discussed for coordination-type polymerizations.

Polymerization times can vary from a few seconds (i.e., 5) to several days, for example, two to three days or more depending on the particular monomer, initiator, solvent, and reaction temperature employed.

Polymerization pressures above and below atmospheric pressure are operable. Atmospheric and superatmospheric pressures are preferred.

The homopolymers of 1-arylbicyclo[1.1.0]butanes of this invention are high molecular weight, solid, thermoplastic polymers which are useful for preparing shaped objects of all sorts, such as films, fibers, tubes, pipes, bottles, and molded objects of many shapes. Solution casting, "dry" spinning from solution, melt extrusion, injection molding, compression molding, and blow molding may be employed.

The following examples illustrate the invention in further detail but are not meant to limit the invention in any respect. Unless other indicated, parts are by weight.

EXAMPLE 1

Part A—3-bromocyclobutanone.—To a stirred mixture of 114 parts of 3-ketocyclobutanecarboxylic acid in 1100 parts of carbon tetrachloride was added at room temperature 173 parts of red mercuric oxide. The mixture was heated to 70° C., and a solution of 160 parts of bromine in 320 parts of carbon tetrachloride was added over 3 hours. About 27.5 parts of carbon dioxide was collected. After the addition was completed, the reaction mixture was cooled to room temperature and filtered. Most of the solvent was removed at 30° C./135 mm. through a column packed with glass helices. The final traces of solvent were removed at 25° C./5 mm. giving rise to 81.4 parts (54.6%) of crude 3-bromocyclobutanone. This material was used in Part B without further purification. The residue from another run was distilled at 29° C./1.8 mm. giving 52.7 parts (35%) of 3-bromocyclobutanone. The infrared, n-m-r, and mass spectra were in accordance with the proposed structure.

*Analysis.*—Calcd. for $C_4H_5OBr$: C, 32.24; H, 3.38; Br, 53.64. Found: C, 31.89; H, 3.55; Br, 53.75.

Part B—1-hydroxy-1-phenyl-3-bromocyclobutane.—To 450 parts of cold (0° C.) tetrahydrofuran was added under a blanket of nitrogen 122 parts of phenylmagnesium bromide in 160 parts of ether. To this solution was added at 0° to 5° C. over 1.25 hours a solution of 81.4 parts of crude 3-bromocyclobutanone (Part A) in 90 parts of tetrahydrofuran. The solution was then stirred at room temperature for 1.5 hours. The mixture was then cooled and acidified with 10% hydrochloric acid solution. The layers were separated, and the water layer was extracted three times with 70 parts of ether. The combined extracts were washed twice with 100 parts of saturated sodium chloride solution and dried over magnesium sulfate. Removal of the solvent under reduced pressure gave 107 parts (87%) of 1-hydroxy-1-phenyl-3-bromocyclobutane in the form of an oil. This material was used in Part C without further purification. The infrared and n-m-r spectra exhibited absorptions consistent with the named structure.

Part C—1-chloro-1-phenyl-3-bromocyclobutane.—To a solution of 107 parts of crude 1-hydroxy-1-phenyl-3-bromocyclobutane (Part B) in 180 parts of benzene was added 105 parts of hexane. This mixture was shaken vigorously in a separatory funnel for 3 to 4 minutes with 160 parts of a solution containing 130 parts of concentrated hydrochloric acid and 100 parts of anhydrous zinc chloride. The mixture was filtered through a plug of glass wool, and the separatory funnel was rinsed twice with 50 parts of a solution containing 1.8 parts of benzene and 1.0 part of hexane. The filtrate was transferred to another separatory funnel and shaken vigorously for one minute. The layers were separated, and the aqueous layer was washed twice with 50 parts of the 1.8/1 benzene-hexane mixture. The combined organic phase was washed three times with 100 parts of cold water, twice with 100 parts of cold, dilute sodium bicarbonate solution, and twice with 100 parts of saturated sodium chloride solution. The organic phase was dried over magnesium sulfate, and the solvent was removed under reduced pressure at 30° C. to give 79 parts of oil. The oil was dissolved in ether, which was then cooled with stirring at −78° C. The solid was quickly filtered off, and concentrating was repeated until no more solid was obtained. A total of 23 parts of crude solid was obtained by this procedure. Recrystallization of the solid from hexane gave crystalline 1-chloro-1-phenyl-3-bromocyclobutane, M.P. 56–57° C. The infrared and n-m-r spectra were in accordance with the named structure.

*Analysis.*—Calcd. for $C_{10}H_{10}BrCl$: C, 48.90; H, 4.10; Cl, 14.44; Br, 32.54. Found: C, 49.04; H, 4.09; Cl, 14.48; Br, 32.55.

Part D—1-phenylbicyclo[1.1.0]butane.—To 2.5 parts of magnesium metal in 90 parts of tetrahydrofuran was added over 1.5 hours 17.6 parts of 1-chloro-1-phenyl-3-bromocyclobutane (Part C) in 35 parts of tetrahydrofuran. Cooling was required to maintain the temperature at 25° C. The mixture was stirred at 25° C. for 15 hours, and the excess magnesium was then filtered off. The filtrate was poured with stirring into a solution of 200 parts of saturated sodium bicarbonate solution and 450 parts of water. This was extracted four times with 50 parts of petroleum ether (B.P. 30–60° C.), which was then washed with 50 parts of saturated sodium chloride solution and dried over sodium sulfate. A small amount of hydroquinone was added to the petroleum ether solution, which was then concentrated at room temperature under reduced pressure. This gave 9.5 parts of a liquid which was distilled under reduced pressure, B.P. 33° C./0.8 mm. When one-third of the 1-phenylbicyclo[1.1.0]butane had been collected, the remainder polymerized. The n-m-r and infrared spectra of the distilled liquid were in accordance with the named structure.

*Analysis.*—Calcd. for $C_{10}H_{10}$: C, 92.24; H, 7.74. Found: C, 91.75; H, 7.66.

Part E—Poly-1-phenylbicyclo[1.1.0]butane.—Films of the monomer obtained in Part D polymerized to tough, colorless polymer when allowed to stand at room temperature.

EXAMPLE 2

Part A—3 - hydroxy - 3 - phenylcyclobutanecarboxylic acid.—To a stirred solution of 147.8 parts of 3-ketocyclobutanecarboxylic acid in 1350 parts of tetrahydrofuran was added over 6 hours at 20° to 30° C. 470 parts of phenylmagnesium bromide in 700 parts of ether. After the addition was completed, the solution was cooled and acidified with 600 parts of 50% hydrochloric acid solution. The organic layer was dried over magnesium sulfate, and the solvent was removed at reduced pressure. The semisolid residue was dissolved in aqueous sodium bicarbonate, which was then extracted three times with 70 parts of ether. The aqueous phase was then acidified with concentrated hydrochloric acid, and the product was filtered off and washed with water. The solid was dried to give 145 parts of 3-hydroxy-3-phenylcyclobutanecarboxylic acid, M.P. 142–143° C. Additional product was obtained by a 24-hour ether extraction of the aqueous phases obtained in the above procedure. The total yield of product was 75%. The infrared and n-m-r spectra were in accordance with the named structure.

*Analysis.*—Calcd. for $C_{11}H_{12}O_3$: C, 68.73; H, 6.30. Found: C, 69.41; H, 6.34.

Part B—3-chloro-3-phenylcyclobutanecarboxylic acid.—A separatory funnel was charged with 270 parts of benzene, 21.4 parts of 3-hydroxy-3-phenylcyclobutanecarboxylic acid, and 100 parts of concentrated hydrochloric acid. The mixture was shaken vigorously until all the solid had dissolved (about 2 minutes). The layers were separated, and the aqueous layer was washed twice with 50 parts of benzene. The combined organic phase was washed twice with 70 parts of water and 70 parts of saturated sodium chloride solution. The benzene solution was dried over magnesium sulfate and then concentrated under reduced pressure to give 23.8 parts (100%) of 3-chloro-3-phenylcyclobutanecarboxylic acid in the form of a dry, white solid. The stereoisomers were partially separated by recrystallization from benzene, M.P. 110–118° C. and M.P. 82–85° C. The infrared and n-m-r spectra were in accordance with the proposed structure.

*Analysis.*—Calcd. for $C_{11}H_{11}O_2Cl$: C, 62.70; H, 5.26; Cl, 16.83. Found: C, 62.29; H, 5.21; Cl, 16.65.

Part C—1 - acetoxy-1-phenyl-3-chlorocyclobutane.—A glass reactor was charged with 1800 parts of benzene, 173 parts of 3-chloro-3-phenylcyclobutanecarboxylic acid, and 365 parts of dry lead tetraacetate. The system was purged with nitrogen for 15 minutes, and 40 parts of lithium chloride was added. On heating the mixture with stirring to 70° C., a large amount of reaction mixture issued forth from the reaction pot. The remaining material was refluxed for 3 hours. The liquid was then siphoned from the cooled reaction mixture and treated with ethylene glycol to destroy excess lead tetraacetate. The solution was then washed with water, sodium bicarbonate solution, and saturated sodium chloride solution. The solution was dried over magnesium sulfate, and the benzene was removed under reduced pressure. Distillation of the residue gave 4.4 parts of a mixture of 1-acetoxy-1-phenyl-3-chlorocyclobutane, 1,3-dichloro-1-phenylcyclobutane, and an olefin, B.P. 70° C./0.15 mm. A second cut gave 16.6 parts of fairly pure 1-acetoxy-1-phenyl-3-chlorocyclobutane, B.P. 90–100° C./0.36 mm. The infrared and n-m-r spectra were in accordance with the named structure.

Part D—1,3-dichloro-1-phenylcyclobutane.—A solution of 13 parts of 1-acetoxy-1-phenyl-3-chlorocyclobutane (Part C) in about 50 parts of benzene was heated to 70° C. and then saturated with gaseous hydrogen chloride. This temperature was maintained for 3 hours and then the solution was allowed to stand at room temperature for 63 hours. Nitrogen was then bubbled through the dark solution to dispel the hydrogen chloride. The solvent was removed, and the residue was distilled to give 3.1 parts of a mixture of 1,3-dichloro-1-phenylcyclobutane, 1-acetoxy-1-phenyl-3-chlorocyclobutane, and an olefin, B.P.

70–80° C./0.27 mm. and 6.1 parts of fairly pure 1-acetoxy-1-phenyl-3-chlorocyclobutane, B.P. 89–92° C./0.27 mm. An intermediate cut gave 2.2 parts of a mixture of the three components, B.P. 80–89° C./0.27 mm. The infrared and n-m-r spectra were consistent with the presence of the named structures.

Part E—1-phenylbicyclo[1.1.0]butane.—A mixture of 10 parts of tetrahydrofuran, 0.25 part of magnesium metal, and 1.0 part of crude 1,3-dichloro-1-phenylcyclobutane (Part D, B.P. 70–80° C./0.27 mm.) was stirred for 15 hours at room temperature under a blanket of nitrogen. The excess magnesium was then filtered off, and the filtrate was poured into 100 parts of water. This was then extracted three times with 25 parts of petroleum ether (B.P. 30–60° C.) which was then dried over sodium sulfate. Removal of solvent gave a crude product whose n-m-r showed unmistakably the presence of 1-phenylbicyclo[1.1.0]butane.

When the bromides shown in Column A of Table I below are converted to the corresponding Grignard reagents by reaction with magnesium and the resulting Grignard reagents are used in the procedure of Example 1 in place of phenylmagnesium bromide in Part B, the 1-arylbicyclo[1.1.0]butane shown in Column B is obtained in Part D. The bicyclobutanes are converted to their respective polymers by the action of α,α'-azodiisobutyronitrile.

TABLE I

| Item | A. Halide | B. 1-arylbicyclo[1.1.0]butane |
|---|---|---|
| 1 | 2-naphthyl bromide | 1-(2-naphthyl)bicyclo[1.1.0]butane. |
| 2 | 2-bromotriphenylene ($C_{18}H_{11}Br$). | 1-(2-triphenylene)bicyclo[1.1.0]-butane. |
| 3 | 1-p-bromophenyl-dodecane. | 1-(p-dodecylphenyl)bicyclo-[1.1.0]butane. |
| 4 | p-Bromotoluene | 1-(p-tolyl)bicyclo[1.1.0]butane. |

When the procedure of Example 1 is followed and the cyclobutanecarboxylic acids shown in Column A of Table II below are substituted for 3-ketocyclobutanecarboxylic acid in Part A of the example, the respective monomers obtained in Part D of the procedure are indicated in Column B. The bicyclobutanes are converted to their respective homopolymers by the action of α,α'-azodiisobutyronitrile.

TABLE II

| Item | A. 3-oxocyclobutanecarboxylic acid | B. 1-arylbicyclo[1.1.0]butane |
|---|---|---|
| 1 | 3-oxo-2,4-diphenylcyclo-butanecarboxylic acid. | 1,2,4-triphenylbicyclo-[1.1.0]-butane. |
| 2 | 2-methyl-3-oxocyclobutane-carboxylic acid. | 2-methyl-1-phenylbicyclo-[1.1.0]butane. |
| 3 | 2-ethyl-3-oxocyclobutane-carboxylic acid. | 2-ethyl-1-phenylbicyclo[1.1.0]-butane. |
| 4 | 2-dodecyl-3-oxocyclobutane-carboxylic acid. | 2-dodecyl-1-phenylbicyclo-[1.1.0]butane. |
| 5 | 2-cyclohexyl-3-oxocyclo-butanecarboxylic acid. | 2-cyclohexyl-1-phenylbicyclo-[1.1.0]butane. |
| 6 | 2-cyclohexylmethyl-3-oxo-cyclobutanecarboxylic acid. | 2-cyclohexylmethyl-1-phenyl-bicyclo[1.1.0]butane. |
| 7 | 2-benzyl-3-oxocyclobutane-carboxylic acid. | 2-benzyl-1-phenylbicyclo-[1.1.0]butane. |
| 8 | 2-phenethyl-3-oxocyclobutane-carboxylic acid. | 2-phenethyl-1-phenylbicyclo-[1.1.0]butane. |
| 9 | 2-(p-tolyl)-3-oxocyclobutane-carboxylic acid. | 2-(p-tolyl)-1-phenylbicyclo-[1.1.0]butane. |
| 10 | 2-octadecyl-3-oxocyclobutane-carboxylic acid. | 2-octadecyl-1-phenylbicyclo-[1.1.0]butane. |
| 11 | 2-decyl-2-methyl-3-oxocyclo-butanecarboxylic acid. | 2-decyl-2-methyl-1-phenyl bicyclo[1.1.0]butane. |
| 12 | 2-benzyl-2-phenyl-3-oxocyclo-butanecarboxylic acid. | 2-benzyl-1,2-diphenylbicyclo-[1.1.0]butane. |
| 13 | 2-decyl-2,4,4-trimethyl-3-oxo-cyclobutanecarboxylic acid. | 2-decyl-1-phenyl-2,4,4-tri-methylbicyclo[1.1.0]butane. |

The 3-oxocyclobutanecarboxylic acids in items 3 to 12 in Table II are prepared starting with allenes of formula $CH_2=C=CR^1R^2$ and acrylonitrile using the procedure of Cripps et al., J. Am. Chem. Soc. 81, 2723–8 (1959).

Allenes in which $R^2$ is H and $R^1$ is octadecyl or p-tolyl are prepared by the reaction of octadecylmagnesium bromide or p-tolylmagnesium bromide respectively with propargyl bromide using the procedure shown by S. Patai in "The Chemistry of Alkenes," Interscience, 1964, pages 1042–47.

2-decyl-2,4,4-trimethyl-3-oxocyclobutanecarboxylic acid is prepared by the alkylation of 2-decyl-2-methyl-3-oxo-cyclobutane carboxylic acid using sodium hydride and methyl iodide.

In the synthesis of compounds of Formula I shown in Column B of Tables I and II from the Grignard reagents indicated in Column A of Table I and the compounds of Formula III indicated in Column A of Table II, the corresponding 1-aryl-3-halo-1-hydroxycyclobutanes of Formula V and 1-aryl-1,3-dihalocyclobutanes of Formula VI are obtained as intermediates.

The process for preparing a compound of Formula I comprises reacting a 3-ketocyclobutyl halide of Formula IV with an arylmagnesium halide in a mole radio of 1:0 to 10:1, preferably 1:1, in an inert solvent such as ether or tetrahydrofuran. By this reaction, a compound of Formula V is formed which is isolated by neutralization of the reaction, extraction with evaporation of the solvent. The compound of Formula V can be converted to the dihalide of Formula VI by reacting with a mixture of a zinc halide and the corresponding hydrohalide at a temperature of 25–75° C. in a solvent such as benzene, hexane and the like. The reaction of the dihalide of Formula VI with an alkali or alkaline-earth metal such as sodium, potassium, magnesium, calcium and the like in a mole ratio of 1:10 to 10:1 and preferably in a mole ratio of 1:2 at temperatures of −10 to 50° C. and preferably at about 25° C. and also preferably in the presence of an inert solvent such as ether, tetrahydrofuran, benzene and the like yields the 1-arylbicyclo[1.1.0]butanes of this invention.

The homopolymers of this invention have the recurring structural unit:

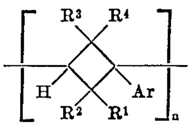

VII wherein $R^1$, $R^2$, $R^3$ and $R^4$ each are hydrogen or hydrocarbyl of 1–18 carbon atoms which are free of aliphatic carbon-carbon unsaturation, Ar is aryl or alkaryl of 6–18 carbon atoms and $n$ is greater than 4. Preferably, $R^1$, $R^2$, $R^3$ and $R^4$ is hydrogen, Ar is phenyl, tolyl or naphthyl and $n$ is greater than 100.

The bicyclo[1.1.0]butanes of this invention are useful as monomers for the production of homopolymers. The homopolymers of high molecular weight can be used to form self-supporting films by compression molding at elevated temperatures of the order to 100–150° C. at high pressures.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A compound of the formula

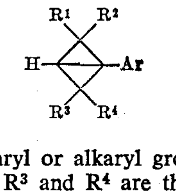

wherein Ar is an aryl or alkaryl group of 6–18 carbon atoms and $R^1$, $R^2$, $R^3$ and $R^4$ are the same or different and are hydrogen or a hydrocarbyl group of 1–18 carbon atoms free of ethylenic unsaturation.

2. The compound of claim 1 wherein $R^1$, $R^2$, $R^3$ and $R^4$ are hydrogen and Ar is phenyl said compound being 1-phenylbicyclo[1.1.0]butane.

3. Process for preparing a compound of claim 1 comprising reacting a dihalide compound of the formula

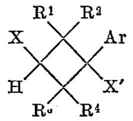

wherein $R^1$, $R^2$, $R^3$ and $R^4$ are the same or different and are hydrogen or a hydrocarbyl group of 1–18 carbon atoms free of ethylenic unsaturation, Ar is an aryl or alkaryl group of 6–18 carbon atoms and X and X' are halogen with an alkali or alkaline-earth metal.

4. A homopolymer having the recurring structural unit:

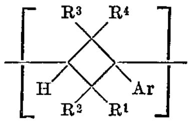

wherein $R^1$, $R^2$, $R^3$ and $R^4$ each are hydrogen or hydrocarbyl of 1–18 carbon atoms which are free of aliphatic carbon-carbon unsaturation, and Ar is aryl or alkaryl of 6–18 carbon atoms.

No references cited.

DELBERT E. GANTZ, Primary Examiner

CURTIS R. DAVIS, Assistant Examiner

U.S. Cl. X.R.

260—618, 650, 668